United States Patent

Kamikuri et al.

[11] Patent Number: 5,767,188
[45] Date of Patent: Jun. 16, 1998

[54] WATER-BASED PAINT COMPOSITION, PAINTING METHOD AND PAINT FILMS

[75] Inventors: Joshimasa Kamikuri, Kanagawa, Japan; Ulrich Hermann, Münster, Germany; Kazuyoshi Furuuchi; Toshihiko Nakamishi, both of Kanagawa, Japan

[73] Assignee: BASF Lacke +Farben, AG, Muenster-Hiltrup, Germany

[21] Appl. No.: 553,319

[22] PCT Filed: May 26, 1994

[86] PCT No.: PCT/EP94/01689

§ 371 Date: Jan. 19, 1996

§ 102(e) Date: Jan. 19, 1996

[87] PCT Pub. No.: WO94/28077

PCT Pub. Date: Dec. 8, 1994

[30] Foreign Application Priority Data

May 28, 1993 [JP] Japan ..................... 5-127366

[51] Int. Cl.$^6$ .................. C08J 3/00; C08K 3/20; C08L 75/00; B32B 27/00
[52] U.S. Cl. .................. 524/507; 427/372.2; 427/385.5; 427/393.5; 428/423.1; 428/424.2; 428/424.8; 524/591; 524/839; 524/840; 525/123; 525/455
[58] Field of Search ..................... 524/507, 591, 524/839, 840; 428/423.1, 424.2, 424.8; 427/372.2, 385.5, 393.5; 525/123, 455

[56] References Cited

FOREIGN PATENT DOCUMENTS 0 379 158A2  1/1990  European Pat. Off. ...... C09D 174/04
0 466 136 A1  7/1991  European Pat. Off. ...... C09D 175/04

OTHER PUBLICATIONS

Derwent, "Aqueous resin composition paint adhesive comprise chlorinated polyolefin base sodium hydroxide tri ethylamine option surfactant".

Primary Examiner—Patrick D. Nilano

[57] ABSTRACT

Water-based primer composition made up of (A) a water-compatibilised modified polyolefin type resin, which is a modified polyolefin resin modified with an α,β-unsaturated carboxylic acid, of a saponification value of 10–60 mg KOH/g, a number average molecular mass of 4000–30,000 and a degree of chlorination of 0–30 wt %, water-compatibilised by means of an amine compound, and if necessary additionally by a surfactant, (B) a water-compatibilised acrylic resin of a glass transition temperature of −50° to 20° C., and (C) a water-compatibilised polyurethane resin of a break elongation of 200–600%, and if necessary an additional curing agent, in which the contents of the different components are (A) 25–70 wt %, the sum of (B) and (C) 30–75 wt %, and the ratio by weight of (B)/(C) 100/0–50/50.

7 Claims, No Drawings

WATER-BASED PAINT COMPOSITION, PAINTING METHOD AND PAINT FILMS

The present invention relates to water-based paint compositions, a painting method and paint films; more narrowly, it relates to water-based paint compositions suitable as primers of plastic material, and particular polypropylene material, to a method of painting them, and to their paint films.

Plastic materials are popular as industrial materials for automobiles and household electrical appliances. Polypropylene materials in particular are among the materials most in demand because have good chemical and physical properties, are light and low priced, and moreover are easy to recycle, etc.

However, because polypropylene materials have low polarity and crystallinity, paint films do not readily adhere to them, and in normal painting special pre-treatment is necessary.

As the above pretreatment, flame treatment, corona discharge treatment, treatment by exposure to ultraviolet radiation, plasma treatment and painting with special primer can be cited; but flame treatment is a fire hazard, and corona discharge treatment, ultraviolet irradiation and plasma treatment are not very popular either, for reasons such as the fact that treatment uniform treatment of material in complex shapes is difficult, and that the costs of equipment are considerable, etc.; and the adherence of paint films is generally ensured by painting with a special primer. In the automobile industry, painting with special primers of this type is generally carried out as follows.

Firstly, the polypropylene material is degreased and cleaned in 1,1,1-trichloroethane vapour and then dried. The special primer is painted onto this polypropylene material, it is dried naturally or force dried, and then the topcoat paints are painted onto the surface of the primer, heated and cured to form a completed paint film on the material.

The role of the special primer here is to ensure adherence with both the polypropylene material and the topcoat paint film. Consequently, special primers include as an essential component polyolefin resin with a high affinity for the polypropylene material in order to confer adhesion to the polypropylene material; and adherence to the topcoat paint film is ensured by further introducing polar groups into this polyolefin, and if necessary using it mixed with a polar resin. An example of such specialised primers are primer compositions made up of epoxy resin and chlorinated polyolefin resin modified with an acid anhydride, known in Japanese Examined Patent 63-50381.

However, the polyolefin resins which are essential resin components in prior special primers have quite high molecular masses, and are not readily soluble in organic solvents, so primers adjusted to a viscosity suitable for painting contain a large quantity of organic solvent, and a large quantity of organic solvent is released into the atmosphere during painting. Consequently, there is a risk of fire, and problems with deterioration of the working environment and atmospheric pollution are produced.

Similarly, the 1,1,1-trichloroethane which is employed for degreasing and cleaning polypropylene materials destroys the ozone layer, and its use is restricted; hence, new degreasing and cleaning methods are being investigated, and the switch over to these new methods has already begun. The new methods are largely water washing methods using acid or alkaline detergents.

However, whereas the method using 1,1,1-trichloroethane, besides cleaning the surface of the material, acts to swell the material and etch the surface, which contributes considerably to adhesion between the special primer and the material, the new methods are weak as far as this sort of action is concerned, and switching to the new methods invites a decrease in adhesion between special primers and the material. This lowering of adhesion affects particularly the petrol resistance and water resistance of the paint film, and means that the paint film becomes prone to blistering and peeling. Various methods are available for testing the petrol resistance of paint films; particularly rigorous are tests of petrol resistance in which the coating is immersed in a liquid mixture of petrol and alcohol.

Under such circumstances, water-based paints which allow a considerable decrease in organic solvent use compared with solvent-based paints, are desirable as primers for polypropylene materials; and moreover, primers are needed which can form excellent paint films after degreasing and cleaning using water, without the need for degreasing and cleaning with 1,1,1-trichloroethane.

In Japanese Unexamined Patent [Kokai] 3-124779, Japanese Unexamined Patent 3-182534 and Japanese Unexamined Patent 4-72337, water-based paint compositions are disclosed in which water-compatibilised modified polyolefin resin and urethane resin are the main resin components. However, paint films formed from these water-based paint compositions have the problem that they have inferior petrol resistance, water resistance and humidity resistance on polypropylene materials degreased and cleaned by washing in water.

The purpose of the present invention is to solve the problems above, and to offer water-based paint compositions which, besides being excellent in adhesion to plastic material and allowing degreasing and cleaning by washing in water, form paint films excellent in water resistance, humidity :resistance and petrol resistance, together with a method of painting them, and paint films formed by them.

As the result of concerted studies on the theme above, the present inventors discovered that by employing water-compatibilised modified polyolefin resins, water-compatibilised acrylic resins and water-compatibilised polyurethane resins within specific ranges, satisfactory water-based paint compositions can be obtained. They also discovered that for applications in which petrol/alcohol resistance is required., by making the paint film a cured paint film, water washing without employing 1,1,1-trichloroethane was applicable as a method for degreasing and cleaning polypropylene. As the result of further studies on cured paint films, they also discovered that various functional groups could be introduced more readily into acrylic resin than into the other resins; and by combination with water-soluble or water-dispersible water-based crosslinking agents causing crosslinks with these functional groups, many forms of crosslinking reaction could be employed, enabling paint design to meet a wide range of paint film forming conditions.

The present inventors, have perfected the present invention based on these insights. Thus, the present invention is the following water-based paint compositions, a method for coating it, and paint films formed from it.

(1) Water-based paint compositions characterised in that the resin component contains resins chosen from
 (A) water-compatibilised modified polyolefin type resins which are water-compatibilised modified polyolefin resins modified with an α,β-unsaturated carboxylic acid, of a saponification value of 10–60 mg KOH/g, a number average molecular mass of 4000–30,000. and a degree of chlorination in the range 0–30 wt %, and (B) water-compatibilised acrylic resins which are water-compatibilised acrylic resins with a glass transition temperature of −50° to +20° C., and (C) water-compatibilised polyurethane resins which are water-compatibilised polyurethane resins of a break elongation in the range 200–600% at 20° C., in which, in the total quantity of resin solids, the proportion of Component (A) is 25–70 wt %, the sum of Component (B) and Component (C) is 30–75 wt %, and the ratio by weight of resin solids of Component (B) and Component (C) is Component (B)/Component (C)=100/0-50/50.

(2) Water-based paint compositions of (1) above, characterised in that Component (B) has at least 1 type of functional group chosen from a group comprising carboxyl groups, carbonyl groups, epoxy groups and hydroxyl groups, and that the equivalent weight of functional groups in Component (B) is in the range of 500–2000 g/Equivalent weight, and that it contains in addition to Component (A)–(C) a further water-based curing agent which reacts with the aforementioned functional groups.

(3) A painting method characterised in that a water-based paint composition of (1) or (2) above is painted onto a plastic material, and dried or cured/dried.

(4) Paint film characterised in that it is obtained by painting a water-based paint composition of (1) or (2) above, and drying or curing/drying.

In the present specification "water-based" means that resins, hardeners or paints, etc., are in a state in which they can dissolve or disperse stably in water, or are dissolved or dispersed in water*.

Similarly "water-compatibilised" here means that resins, etc., are made into an water-based state.

First each of the components employed in the present invention will be explained.

Modified polyolefin resins employed in the present invention are polyolefin resins modified with α,β-unsaturated carboxylic acids or acid anhydrides, and if necessary also chlorinated.

As pre-modified polyolefin resins, resins comprising a resin skeleton in which olefin monomers and/or diene monomers are the primary structural monomers, such as polypropylene, ethylene/propylene copolymers, ethylene/propylene/diene copolymers, polybutadiene, styrene/butadiene block polymers and their hydrogenated forms, and styrene/isoprene block polymers and their hydrogenated forms, etc., can be cited.

Preferred modified polyolefin resins have a number average molecular mass of in the range 4000–30,000, and preferably 9000–23,000. If number average molecular mass is less than 4000, adhesion to plastic materials, and particularly propylene materials, and petrol resistance, bending resistance and impact resistance will be lowered. A number average molecular mass exceeding 30,000 is undesirable, because water-compatibilisation becomes difficult.

As α,β-unsaturated carboxylic acids or anhydrides thereof for modifying the polyolefin resins, maleic acid (anhydride), citraconic acid (anhydride) and itaconic acid (anhydride), etc., can be cited, and maleic anhydride can be used to particular advantage.

Modification can be performed by a method such as graft polymerizing the α,β-unsaturated carboxylic acid to the polyolefin resin, etc.

The degree of modification can be indicated by saponification value, and modified polyolefin resins having a saponification value in the range 10–60 mg KOH/g, and preferably 18–55 mg KOH/g. If the saponification value is less than 10 mg KOH/g large quantities of surfactant will be needed in making the modified polyolefin resin water compatible; and if the saponification value exceeds 60 mg KOH/g the resin will become highly hydrophillic, lowering the water-resistance of the paint film.

If necessary, the modified polyolefin resin can also be chlorinated. Chlorination can be performed at any point before, after, or at the same time as modification with an α,β-unsaturated carboxylic acid or anhydride thereof. In this case, the degree of chlorination of the resin employed will be in the range 0–30 wt %, and preferably 20–27 wt %. If the degree of chlorination exceeds 30 wt %, adhesion to plastic material, and particularly polypropylene material, bending resistance and impact resistance will be lowered.

As the modified polyolefin resin, 1 type can be employed on its own, or 2 or more types can be employed in combination.

In order to water-compatibilise such modified polyolefin resins, they can be reacted with ammonia or an amino compound such as a primary-tertiary amine to form a salt.

As amino compounds, tertiary amines such as triethylamine, tripropylamine, tributylamine, dimethylethanolamine, triethanolamine and pyridine, etc., secondary amines such as dipropylamine, dibutylamine, ethanolamine and piperidine, etc., and primary amines such as propylamine, butylamine, ethanolamine and aniline, etc., can be employed; but tertiary amines can be used to particular advantage. The quantity of ammonia or amino compound employed is desirably in the range of 0.5–3.0 mol, and preferably 0.8–2.5 mol. to 1 mol of the modified polyolefin resin being water-compatibilised.

If necessary surfactants can also be employed to water-compatibilise the modified polyolefin resin. As surfactants, nonionic surfactants such as poly(oxyethylene) monoalkyl ethers, poly(oxyethylene) monoalkylaryl ethers and poly (oxyethylene) monoalkyl esters, etc., and anionic surfactants such as poly(oxyethylene) alkylaryl sulphate salts, alkylaryl sulphate salts and alkyl sulphate salts, etc., can be employed. As for the quantity of surfactant employed: usually a quantity in the range of 10 wt % or less, and preferably 2.5 wt % or less, relative to the dry weight of modified polyolefin resin, is desirable. If more than 10 wt % is used the water-resistance of the paint film will tend to be lowered.

Acrylic resins which can be employed in the present invention have a glass-transition point in the range −50° C. to +20° C., and preferably −50° C. to 0° C. With a glass transition point lower than −50° C. the surface of the paint film becomes noticeably tacky, and if it exceeds +20° C., the impact resistance and bending resistance of the paint film will be lowered.

As monomers constituting the acrylic resin, alkyl ester derivatives of (meth)acrylic acid with 1–18 carbons such as methyl (meth)acrylate, ethyl (meth)acrylate, propyl (meth) acrylate, butyl (meth)acrylate, hexyl (meth)acrylate, octyl (meth)acrylate and stearyl (meth)acrylate, etc., styrene and styrene derivatives such as α-methylstyrene and p-vinyltoluene, etc., unsaturated monomers containing sulphonic acid groups such as sulphoethyl (meth)acrylate, sulphopropyl (meth)acrylate and sulphobutyl (meth) acrylate, etc., unsaturated monomers containing phosphoric acid groups such as mono(meth)acryloyloxyethyl acid phosphate and mono(meth)acryloyloxypropyl acid phosphate, etc., and also (meth)acrylonitrile, acrylamide, vinyl acetate and vinyl chloride, etc., can be cited.

Functional groups can be introduced into acrylic resin more easily than into the other components (A) and (C)

employed in the present invention; and by making curable paints, using a resin into which such functional groups have been introduced in conjunction with a curing agent, the petrol resistance of the paint film, and particularly petrol/alcohol resistance, can be raised. As functional groups, carboxyl groups, carbonyl groups, epoxy groups and hydroxyl groups, etc., can be cited.

Examples of unsaturated monomers containing functional groups include monomers containing carboxyl groups such as (meth)acrylic acid and their macromer products of Michael addition, itaconic acid (anhydride) and maleic acid (anhydride), etc., monomers containing carbonyl group such as acrolein, diacetone acrylamide, vinyl ethyl ketone and acetoacetylethyl (meth)acrylate, etc., monomers containing epoxy groups such as glycidyl (meth)acrylate, 3,4-epoxycyclohexyl (meth)acrylate and allyl glycidyl ether, etc., and monomers containing hydroxyl groups such as 2-hydroxyethyl (meth)acrylate, hydroxypropyl acrylate and hydroxybutyl acrylate, and _caprolactone addition compounds of these monomers containing hydroxyl groups, etc.

As for the content of monomers containing functional groups, the equivalent weight of functional groups in the acrylic resin should be adjusted to be within the range 500–2000 g/Equiv., and preferably 500–1600 g/Equiv. With a functional group equivalent weight of less than 500 g/Equiv., the curing of the paint film will proceed too far and flexibility will be lowered; and if it exceeds 2000 g/Equiv. hardening will be inadequate and benefits in terms of raised petrol/alcohol resistance will be small.

Acrylic resins can be made by emulsion polymerisation, and can also be made by solution polymerisation in a usual organic solvent. By adopting the alternative of emulsion polymerisation, the manufacture and water-compatibilisation of the polymer can be performed at the same time. Emulsion polymerisation also has the advantage, in addition to the fact that water-compatibilised acrylic resin be made directly, that very high molecular mass acrylic resins which are difficult to make by solution polymerisation can be easily obtained; and it is the preferred method.

There are no particular restrictions as to the method for emulsion polymerisation, and methods using usual surfactants, or soap-free emulsion polymerisation employing reactive surfactants or protective colloids, can be employed. The quantity of surfactant employed is desirably in a range of 5 wt % or less, and preferably 2 wt % or less, of the total quantity the unsaturated monomer components of the acrylic resin. If it exceeds 5 wt %, the water-resistance of the paint film will tend to be decreased. Polymerisation initiators can also be used in emulsion polymerisation; examples include organic peroxides, inorganic peroxides, azo-type polymerisation initiators and redox type polymerisation initiators, etc. Of these, water-soluble inorganic peroxides, for example ammonium persulphate, potassium sulphate and sodium persulphate can be employed to particular advantage.

Emulsion polymerised particles can be homogenous particles made up a homogenous unsaturated monomer component, or they can be core/shell particles using 2 types of monomer components differing in composition in which one is a core component and the other is a shell component. As an example of a method for forming core/shell particles, the unsaturated monomer mixture making up the core component can be added dropwise to an aqueous phase in which a surfactant is dissolved, directly or after emulsification with the use of a small quantity of surfactant, to form the polymer particles which will constitute the core; and then the unsaturated monomer mixture making up the shell component can be added dropwise to the aqueous phase, directly or after emulsification using a small quantity of surfactant, to form a shell layer covering the core particles. In the case of the method above, polymerisation initiator components are preferably added to the aqueous phase separately with each of the unsaturated monomer components.

The emulsion polymer particles can be internally crosslinked particles made by employing multifunctional unsaturated monomers as part of the monomer component, for example esters of a polyfunctional alcohol with (meth)acrylic acid such as diethylene glycol di(meth)acrylate, decane-1,10-diol di(meth)acrylate and trimethylolpropane tri(meth)acrylate, etc., and divinylbenzene, diallyl phthalate and diallyl terephthalate, etc. A quantity of multifunctional monomers of less than 5 wt %, and preferably less than 2 wt %, in the total quantity of unsaturated monomers is desirable; if upwards of 5 wt % is used, the paint-film-forming capacity of the paint will tend to be lowered.

When the acrylic resin is made by a method other than emulsion polymerisation, water compatibilisation can be performed by using ammonia or an amino compound, and if necessary also using a surfactant, as in the case of the aforementioned modified polyolefin resin.

As polyurethane resins employed in the present invention, those which give a dry film with a break elongation in the range 200–600%, and preferably 200–500%, at 20° C. can be used. With a break elongation of less than 200%, impact resistance and bending resistance will be lowered; and if it exceeds 600% the surface will become noticeably tacky.

As such polyurethane resins, macromolecular resins synthesised from multifunctional isocyanate compounds and chain extension agents having at least 2 active hydrogens in the molecule are preferred.

As the above multifunctional isocyanate compounds, multifunctional isocyanate compounds such as diisocyanate compounds, for example hexane-1,6-diisocyanate, lysine diisocyanate, isophorone diisocyanate, cyclohexane-1,4-diisocyanate, xylylene diisocyanate, trilene-2,4-diisocyanate and trilene-2,6-diisocyanate, etc., and their adducts, biuret forms and isocyanurate forms, etc., can be employed.

As the aforementioned chain extension agents, low-molecular weight diol compounds such as ethylene glycol, propylene glycol, butane-1,4-diol, neopentyl glycol, furandimethanol, diethylene glycol, triethylene glycol and tetraethylene glycol, etc., and polyether diol compounds made by addition polymerising these with ethylene oxide, propylene oxide and tetrahydrofuran, etc., polyester diols having terminal hydroxyl groups, obtained from these diol compounds and dicarboxylic acid and their anhydrides such as succinic acid (anhydride), adipic acid (anhydride) and phthalic acid (anhydride), etc., polyvalent alcohols such as trimethylolethane and trimethylolpropane, etc., amino alcohols such as mono-ethanolamine, diethanolamine and triethanolamine, etc., diamino compounds such as ethylenediamine, propylenediamine, butylenediamine, hexamethylenediamine, phenylenediamine, toluenediamine, xylenediamine and isophoronediamine, etc., and also water, ammonia, hydrofuran and dibasic acid hydrazides, etc., can be cited.

The employment as part of the aforementioned chain extension agent of a dihydroxyalkanoic acids, for example 2,2-dimethylpropionic acid [sic], to introduce carboxyl groups into the polyurethane resin, or the employment of a dihydroxyamine addition compounds with an addition reaction product of a diisocyanate compound and a poly (oxyethylene) monoether, for example a compound obtained by reacting diethanolamine with a half-blocked compound obtained by reacting trilene diisocyanate and poly (oxyethylene) monomethyl ether, to introduce poly (oxyethylene) monoether chains into side-chains of the polyurethane resin, is preferred since it facilitates the water-compatibilisation of the polyurethane resin.

The water-compatibilisation of the polyurethane resin can be performed as in the (case of the aforementioned modified polyolefin; for example using ammonia or an amine compound and if necessary a surfactant to water-compatibilise a polyurethane resin made to a high molecular weight by means of multifunctional isocyanate compounds and chain-extension agents, or using ammonia or a amine compound and if necessary a surfactant to water-compatibilise a prepolymer of a molecular weight of less than 10,000 containing isocyanate groups obtained by reacting an empirical excess of a multifunctional isocyanate compound with a chain-extension agent, followed by reaction with water and/or a chain-extension agent in the aqueous phase to increase the molecular weight, etc., can be adopted. In the case of the latter method, the resin can be water-compatibilised at the same time that it is made.

Water-compatibilised polyurethane resins are also available as commercial products. Examples of commercial products which can be employed to advantage include, Takelac W610 (trade name, Takeda Chemical Industries; break elongation 320%), Takelac W710 (trade name, Takeda Chemical Industries; break elongation 510%), U-coat UX-4300 (trade name, Sanyo Chemical Industries; break elongation 400%), U-coat UX-4560 (trade name, Sanyo Chemical Industries, break elongation 270%)

Spensol L-52 (trade names, Dainippon Ink & Chemicals; break elongation 480%)

Neorec R960 (trade name, "Zenekarejinzu"; break elongation 200%), and

Olester UD100N (trade name, Mitsui Toatsu Chemicals; break elongation 250%), etc.

Water-based paint compositions of the present invention include resins selected from the aforementioned water-compatibilised modified polyolefin resins of Component (A), aforementioned water-compatibilised acrylic resins of Component (B) and water-compatibilised polyurethane resins of Component (C), and embraces compositions including only a water-compatibilised modified polyolefin resin of Component (A) and a water-compatibilised acrylic resin of Component (B), as well as compositions in which a water-compatibilised polyurethane resin of Component (C) is further included.

The quantities of each of the components contained in the water-based paint compositions of the present invention, as resin components relative to the total quantity of resin solids, are: water-compatibilised modified polyethylene resin (A) 25–70 wt %, and preferably 30–60 wt %, the sum of water-compatibilised acrylic resin (B) and water-compatibilised polyurethane resin (C) 30–75 wt %, and preferably 40–70 wt %; and the ratio of Component (B) and Component (C) in the resin solids, Component (B)/Component (C)=100/0-50/50, and preferably 100/0-60/40.

With a content of Component (A) of less than 25 wt %, adhesion to plastic materials, and particularly to polypropylene materials, will be weakened; and if it exceeds 70 wt % adhesion to topcoat paint films will be weakened.

It is difficult to regulate the structural flexibility and surface tackiness of water-compatibilised acrylic resins, and since regulation is made easier by concurrent use of water-compatibilised polyurethane resins, concurrent use of a water-compatibilised polyurethane resin is preferred.

Polyurethane resins have a small proportion of side chains relative to the main chain, and compared with acrylic resins they have a close to linear structure and high flexibility and low surface tackiness are both easily achieved; on the other hand, they are inferior in water-resistance because they have hydrolysable or highly hydrophillic bonds such its ester bonds and ether bonds, etc., in the main chain. Consequently, when a water-compatibilised polyurethane resin is used, the ratio of the water-compatibilised acrylic resin and the water-compatibilised polyurethane resin in the mixture is restricted to the above range. If the inclusion of water-compatibilised polyurethane resin exceeds the above range, the water-resistance and humidity-resistance of the paint film will be lowered.

Water-based paint compositions of the present invention can be used as non-curing paints with no curing agent included, but preferably a curing agent is included and they are cured by means of the curing agent.

Curing agents which can be employed in the present reaction are curing agents which will react with the functional groups in the water-compatibilised acrylic resin to form a cured paint film. Specifically, water-soluble or water-dispersible water-based curing agents such as oxazoline type curing agents, amine type curing agents, epoxy type curing agents or amino resins, etc., can be employed. Preferred combinations of acrylic resin functional groups and curing agents are listed below.

(1) Carboxyl groups and an oxazoline type curing agent;
(2) Carboxyl groups and an epoxy type curing agent;
(3) Carbonyl groups and an amine type curing agent;
(4) Epoxy groups and an amine type curing agent;
(5) Hydroxyl groups and an amino resin.

Incidentally, when the aforementioned polyolefin resin includes carboxyl groups, or the polyurethane resin includes functional groups such as carboxyl groups or hydroxyl groups, etc., these functional groups, like the functional groups of the acrylic resin, also participate in crosslinking reactions in the combinations listed above.

As aforementioned oxazoline type curing agents, compounds having at least 2 oxazoline groups per molecule can be employed. Examples of such curing agents available as commercial products include Epocross K-1000 series and "Epocross K-2000 series (all trade names of Nippon Shokubai; acrylic resins in aqueous dispersion containing oxazoline groups), etc., and these can be employed to advantage.

As aforementioned amine type curing agents, polyamine compounds having at least 2 active amino groups or imino groups per molecule, or hydrazine compounds having at least 2 hydrazine groups; per molecule, etc., can be employed. As aforementioned polyamine compounds, compounds having an amino value in the range 100–2000 are preferred: compounds with an amino value of less than 100 are highly toxic and difficult to use, and if the amino value exceeds 2000 it is difficult to obtain adequate paint film curing. Water-compatibilised polyamine compounds are available commercially, and these can be employed to particular advantage. Examples of these include "Aquatote 8535 (trade name, Rhône-Poulenc; modified polyamidoamine with an amino value of 102), Fujicure FX-S913 (trade name, Fuji Chemical Industries; modified aliphatic polyamine type curing agent with an amino value of 210), Polimento KX-CK-200 (trade name, Nippon Shokubai; amino-modified acrylic resin with an amino value of 1900), etc.

As aforementioned hydrazine type compounds, hydrazides of dibasic acids such as succinic acid dihydrazide, adipic acid dihydrazide, sebacic acid dihydrazide and isophthalic acid dihydrazide, etc., aliphatic dihydrazine compounds such as ethylene-1,2-dihydrazine, propylene-1,3-dihydrazine and butylene-1,4-dihydrazine, etc., and 1,3-bis(hydrazinocarboethyl)-5-isopropylhydrantoin, etc., can be cited. Of these, water-soluble succinic acid dihydrazide, adipic acid dihydrazide, and 1,3-bis(hydrazinocarboethyl)-5-isopropylhydrantoin can be used to particular advantage. Aqueous dispersions of carbonyl-group-containing acrylic resins compounded with hydrazine compounds are also available commercially, and can be employed to advantage. Examples of these include the Acronal series (Products of Mitsubishi Petrochemical Badische], etc.

The aforementioned epoxy type curing agents are compounds containing at least 2 epoxy groups per molecule, and include Novolak type epoxy resins and hydrogenated forms thereof and bisphenol A type epoxy resins synthesised from polyvalent phenol compounds, glycidyl ether type epoxy-group-containing compounds synthesised from polyvalent alcohols, glycidyl ester type epoxy-group-containing compounds synthesised from polyvalent carboxylic acids, and epoxyethyl type or cyclic oxirane type multifunctional epoxy type compounds synthesised by oxidising unsaturated double bonds with peroxide compounds. Of these, epoxy type curing agents which are water-soluble, water-dispersible or self dispersing in water are easiest to deal with, and can be employed to particular advantage. As commercial products, Aquatot 510 (trade name, Rhône Poulenc; bisphenol A type epoxy resin, epoxy equivalent 200 g), Aquatote 3520 (trade name, Rhône Poulenc; bisphenol A type epoxy resin, epoxy equivalent 525 g), Aquatote 5003 (trade name, Rhône Poulenc; multifunctional epoxy resin, epoxy equivalent 205 g), Denacol EX-611 (trade name, Nagase Chemical Industries; sorbitol polyglycidyl ether, epoxy equivalent 170 g), and Denacol EM-125 (trade name, Nagase Chemical Industries; epoxycresol plaque emulsion, epoxy equivalent 909 g), etc.

Aforementioned amino resins include compounds in which methylol groups obtained by adding formaldehyde to melamine, guanamine or urea are etherified by an alcohol, etc. Numerous types of amino resin differing in the quantity of formaldehyde added, the type of alcohol used for etherification, the degree of etherification and the degree of condensation are available commercially. Of these, methylated melamine resins etherified with methanol and having a small degree of condensation are readily water-compatibilised, and can be used to advantage. Specifically, Cymel 300, Cymel 303 and Cymel 327 (all trade names of Mitsui Cyanamid), and "Nikarakku" Nicalac MW-30, Nicalac MW-22 and Nicalac MW-24 (all trade names of Sanwa Chemical KK), etc., can be cited.

It is desirable that the quantity of curing agent included be adjusted so that the quantity of functional groups in the curing agent is in the range 0.2–3.0 mol/mol, and preferably 0.5–2.0 mol/mol, relative to the number of molecules as functional groups in Components (A)–(C) which can react with the curing agent. Outside this range it becomes difficult to obtain satisfactory cured paint films.

If a cured paint film is formed by including one of the curing agents above, the flexibility of the paint film will be lowered; but because of considerable benefits in terms of suppressing surface tackiness, it becomes easy to regulate the two. Consequently, by concurrent use of a curing agent, the flexibility and surface tackiness of the paint film can be regulated. As mentioned previously, the petrol/alcohol resistance of the paint film is raised by concurrent use of a curing agent.

Water will be employed as the dispersion medium for the water-based paint compositions of the present invention, but small quantities of organic solvents can also be used alongside water. Organic solvents may be employed as required for the purposes of regulating the surface tension of the paint, eliminating bubbles, and aiding film formation, etc., and can normally be employed at no more than 15 wt %, and preferably in a range of 3–15 wt %. The unnecessary use of large quantities of organic solvent is undesirable for the purposes of the present invention.

There are no particular restrictions as to the types of organic solvent that can be employed, but water-soluble organic solvents such as methanol, ethanol, isopropyl alcohol, acetone, N-methyl- mpyrrolidone, methyl cellosolve, butyl cellosolve and butyl carbitol, etc., can be employed to advantage.

Ultraviolet absorbing agents, photostabilizers, levelling agents, flow-regulating agents, anti-foaming agents, plasticizers, usual pigments, conductive pigments and pigments dispersants or curing catalysts, etc., can also be included as required in water-based paint compositions of the present invention.

Water-based paint compositions of the present invention can be made by mixing the aforementioned essential components and other components included as required, in water or a mixed solution of water and an organic solvent.

Water-based paint compositions of the present invention can be employed as paints in particular for plastic materials, and are particularly suitable for employment as primers. When employed as primers they have both excellent adhesion to the plastic material and also excellent adhesion to topcoat paint films.

As plastic materials which can be painted, a wide variety of materials can be cited, such as polypropylene materials, polyamide materials, poly(butylene terephthalate) materials, unsaturated polyester materials, polyurethane materials, acrylic materials, poly(phenylene oxide) materials, and materials of polyolefins other than polypropylene, etc.; but of these polypropylene materials are preferred.

As for painting with the water-based paint compositions of the present invention, cured paint films can be formed by painting the water-based paint composition onto a plastic material, followed by natural or forced drying, or curing drying. When used as primer paints, complete paint films can be formed by painting onto plastic material and natural or forced drying or curing drying, followed by painting a topcoat paint and heat curing. If required, an undercoat paint film can be formed between the primer paint film and the topcoat paint film. There are no particular restrictions as to the painting method, but spraying or rotational fogging are preferred.

By painting in this manner, adhesion to the plastic material and the topcoat paint film will be excellent, and moreover a paint film of excellent water resistance, humidity resistance and petrol resistance can be formed.

The thickness of the paint film formed is desirably in the range 3–40 μm, and preferably 5–20 μm.

As shown above, water-based paint compositions of the present invention include specific quantities of specific water-compatibilised modified polyolefin resins, water-compatibilised acrylic resins and water-compatibilised polyurethane resins, and thus have excellent adhesion to plastic materials, and allow the material to be degreased and cleaned by washing with water, and form paint films of excellent water resistance, humidity resistance and petrol resistance.

Also, with the painting method of the present invention, paint films which have excellent adhesion to plastic materials, and also have excellent water resistance, moisture resistance and petrol resistance can be easily formed by using the above water-based paint film compositions, the quantity of organic solvents employed can be decreased, and moreover degreasing and cleaning using 1,1,1-trichloroethane becomes unnecessary.

Moreover, with paint films of the present invention, paint films are obtained which have excellent adhesion to plastic materials, water resistance, humidity resistance and petrol resistance, since they are formed from the above water-based paint compositions.

Below, the present invention will be explained in more detail by means of embodiments and comparison examples, but the present invention is not restricted in any way by these examples. In the examples, parts signify parts by weight, and percentages are percentages by weight.

Preparation Example 1: Preparation of Water-Compatibilised Modified Polyolefin Resin A-1

40 parts maleic-anhydride-modified chlorinated polypropylene resin (degree of chlorination 20.2%; saponification value 32.4 mg KOH/g; number average molecular mass 12,800) and 60 parts toluene were added to a flask, and agitated with a homogeniser/disperser as the temperature was raised to 80° C. to completely dissolve the resin. Then, 4.0 parts triethylamine and 20 parts butyl cellosolve were added, to obtain Modified Polyolefin Resin Solution $A_1$.

250 parts deionised water were put into a circulating type line mixer having a hopper tank provided with a thermostat, a mixer, a decreased pressure reflux device, and circulated slowly as; the temperature was raised to 60° C. After raising the temperature, the stirrer was regulated to a speed of 3000 rpm and the line mixer was regulated to 12,000 rpm, and all of the above Modified Polyolefin Resin Solution $A_1$ was added over 1 hour while evaporating off the toluene under decreased pressure. By subsequent further concentration under decreased pressure, Water-Compatibilised Polyolefin Resin A-1 (solids 24.8%; mean particle size 0.2 µm; content of organic solvent (butyl cellosolve) 10.2%) was obtained.

Preparation Example 2: Preparation of Water-Compatibilised Modified Polyolefin Resin A-2

20 parts of maleic-anhydride-modified chlorinated polypropylene resin (1) (degree of chlorination 25%; saponification value 18 mg KOH/g; number average molecular mass 20,100) and 20 parts of maleic-anhydride-modified chlorinated polypropylene resin (2) (degree of chlorination 21.8%; saponification value 38.2 mg KOH/g; number average molecular mass 9800) and 50 parts toluene were added to a flask, and agitated with a homogeniser/disperser as the temperature was raised to 80° C. to completely dissolve the resin. Then, 3.0 parts triethylamine, 0.6 parts ammonium dodecylbenzenesulphonate and 20 parts butyl cellosolve were added, to obtain Modified Polyolefin Resin Solution $A_2$.

230 parts deionised water were put into a line mixer as in Preparation Example 1, and circulated as the temperature was raised to 60° C. After raising the temperature, the stirrer was regulated to a speed of 3000 rpm and the line mixer was regulated to a speed of 12,000 rpm, and all of the above Modified Polyolefin Resin Solution $A_2$ was added over 1 hour while evaporating off the toluene under decreased pressure. By subsequent further concentration under decreased pressure, Water-Compatibilised Polyolefin Resin A-2 (solids 25.2%; mean particle size 0.2 µm; content of organic solvent (butyl cellosolve) 8.8%) was obtained.

Preparation Example 3: Preparation of Water-Compatibilised Modified Polyolefin Resin A-3

300 parts of a 10% toluene solution of a maleic-acid-modified ethylene/propylene copolymer (degree of chlorination 0%; saponification value 54.0 mg KOH/g; number average molecular mass 22,800) and 10 parts of maleic-anhydride-modified polypropylene resin (degree of chlorination 0%; saponification value 38.6 mg KOH/g; number average molecular mass 4980) were added to a flask provided by a decreased pressure reflux device and a stirrer, and stirred as the temperature was raised to 100° C. to bring about complete solution. After dissolving, the toluene was evaporated under decreased pressure to concentrate to 35% solids. Then 3.6 parts triethylamine, 0.8 parts ammonium poly(oxyethylene) nonylphenyl ether sulphate (mean 4.2 mols added ethylene oxide) and 30 parts butyl cellosolve were added to obtain Modified Polyolefin Resin Solution $A_3$.

400 parts deionised water were put into a line mixer as in Preparation Example 1, and slowly circulated as the temperature was raised to 80° C. After raising the temperature, the speed of the stirrer was regulated to 3000 rpm and the speed of the line mixer to 12,000 rpm, and all of Modified Polyolefin Resin Solution $A_3$ above was added over 2 hours, with the toluene being evaporated off under decreased pressure. By subsequent concentration under decreased pressure, Water-Compatibilised Modified Polyolefin Resin A-3 (solids 22.8%; mean particle size 0.3 µm; content of organic solvent (butyl cellosolve) 9.8% was obtained.

Comparison Preparation Example 1: Preparation of Water-Compatibilised Modified Polyolefin Resin a-4

40 parts of a maleic-anhydride-modified chlorinated polypropylene resin (degree of chlorination 40%; saponification value 8 mg KOH/g; number average molecular mass 12,800) and 40 parts toluene were added to a flask, and agitated in a homogeniser/disperser while the temperature was raised to 60° C., to completely dissolve the resin. Then 1.0 part triethylamine, 4.4 parts poly(oxyethylene) nonylphenyl ether (average 20 mols added ethylene oxide) and 20 parts butyl cellosolve were added to obtain Modified Polyolefin Resin Solution $a_4$.

200 parts deionised water were put into the same line mixer as in Embodiment 1, and slowly circulated as the temperature was raised to 60° C. After raising the temperature, the speed of the stirrer was regulated to 3000 rpm and the speed of the line mixer to 12,000 rpm, and all of the above Modified Polyolefin Resin Solution $a_4$ was added over 1 hour, with the toluene being evaporated off under decreased pressure. By subsequent concentration, Water-Compatibilised Modified Polyolefin Resin a-4 (solids 25.0%; mean particle size 0.2 µm; content of organic solvent (butyl cellosolve) 10.1%) was obtained.

Comparison Preparation Example 2 Preparation of Water-Compatibilised Modified Polyolefin Resin a-5

40 parts of a maleic-anhydride-modified chlorinated polypropylene resin (degree of chlorination 19.5%; saponification value 25 mg KOH/g; number average molecular mass 3100) and 20 parts toluene were added to a flask, and agitated in a homogeniser/disperser while the temperature was raised to 60° C., to completely dissolve the resin. Then 1.4 parts triethylamine, 0.8 parts ammonium dodecylbenzenesulphonate and 20 parts butyl cellosolve were added, to obtain Modified Polyolefin Resin Solution $a_5$.

200 parts deionised water were put into the same line mixer as in Embodiment 1, and slowly circulated as the temperature was raised to 60° C. After raising the temperature, the speed of the stirrer was regulated to 3000 rpm and the speed of the line mixer to 12,000 rpm, and all of the above Modified Polyolefin Resin Solution as was added over 1 hour, with the toluene being evaporated off under decreased pressure. By subsequent concentration, Water-Compatibilised Modified Polyolefin Resin a-5 (solids 25.6%; mean particle size 0.2 μm; content of organic solvent (butyl cellosolve) 7.2%) was obtained.

Preparation Examples 4–6: Preparation of Water-Compatibilised Acrylic Resins B-1 to B-3

Water-compatibilised acrylic resins B-1 to B-3 were prepared by the method below.

150 parts deionised water, 0.5 parts of an anionic surfactant (ammonium poly(oxyethylene) nonylphenyl ether sulphate; average 4.2 mols added ethylene oxide) and 0.1 parts sodium tartrate dihydrate were put into a 4-mouthed flask provided with a thermometer, reflux cooler and stirrer, stirred as the temperature was raised to 80° C., and held under stirring for 1 hour.

Then, 0.9 part of the above anionic surfactant was added to 100 parts of monomer mixture (1) recorded in Table 1, agitated in a homogeniser/disperser while 70 parts deionised water were added, and held for 1 hour to obtain an emulsion. 10 parts of this emulsion and 10% of 3.0 parts of 10% aqueous ammonium persulphate solution were put into a flask, and then the remainder of the emulsion and of the 10% aqueous ammonium persulphate solution were added dropwise over 1 hour, and held for 2 hours. After adjusting the water-compatibilised acrylic resin obtained to pH 7–8 using 10% ammonia water, it was adjusted to 30% solids by adding deionised water, to obtain Water-Compatibilised Acrylic Resins B-1 to B-3.

Preparation Examples 7–8: Preparation of Water-Compatibilised Acrylic Resins B-4 to B-5

Water-compatibilised acrylic resins B-4 to B-5 were prepared by the method below.

150 parts deionised water, 0.5 parts of an anionic surfactant (ammonium poly(oxyethylene) nonylphenyl ether sulphate; average 5 mols added ethylene oxide) and 0.1 parts sodium tartrate dehydrate were put into a 4-mouthed flask provided with a thermometer, reflux cooler and stirrer, stirred as the temperature was raised to 80° C., and held under stirring for 1 hour.

Then, 0.72 parts of the above anionic surfactant were added to 80 parts of monomer mixture (1) recorded in Table 2 and agitated in a homogeniser/disperser while 56 parts deionised water were added; agitation was continued for a further 1 hour to obtain an emulsion. 8 parts of this emulsion and 10% of 2.4 parts of 10% aqueous ammonium persulphate solution were put into a flask, and then the remainder of the emulsion and of the 10% aqueous ammonium persulphate solution were added dropwise over 1 hour, and held for 2 hours, to obtain core particles.

Moreover, 0.18 parts of the above anionic surfactant were added to 20 parts of a monomer mixture (2) recorded in Table 2, agitated in a homogeniser/disperser as 14 parts deionised water were added, and held for 1 hour to obtain an emulsion. The emulsion obtained and 0.6 part of 10% aqueous ammonium persulphate were added separately dropwise over 30 minutes, and held for 2 hours. Then, after adjusting to pH 7–8 by adding ammonia water, the solids content was adjusted to 30% by adding deionised water, to obtain core/shell type Water-Compatibilised Acrylic Resins B-4 to B-5.

Comparison Preparation Example 3: Preparation of Water-Compatibilised Acrylic Resin b-6

Water-Compatibilised Acrylic Resin b-6 was obtained from monomer mixture (1) recorded in Table 1 by the same method as the method for preparing Water-Compatibilised Acrylic Resins B-1 to B-3 of Preparation Examples 4–6.

Comparison Preparation Example 4: Preparation of Water-Compatibilised Acrylic Resin b-7

Water-Compatibilised Acrylic Resin b-7 was obtained by the same method as the method of Comparison Preparation Example 3, except that the total quantity of anionic surfactant employed was 5.5 parts.

TABLE 1

| | Preparation Example | | |
|---|---|---|---|
| Water-compatibilised acrylic resin | 4<br>B-1 | 5<br>B-2 | 6<br>B-3 |
| Monomer mixture (1) | | | |
| Styrene | 22.0 | 16.0 | 4.9 |
| n-Butyl acrylate | 64.0 | 64.8 | 72.4 |
| Methyl methacrylate | 10.0 | 10.0 | |
| Acrylic acid | | 7.2 | |
| Acrolein | | | |
| Glycidyl methacrylate | | | |
| 2-Hydroxyethyl acrylate | | | 20.7 |
| Acrylamide | 2.0 | 2.0 | 2.0 |
| Diethylene glycol dimethacrylate | 2.0 | | |
| Total | 100.0 | 100.0 | 100.0 |
| Glass transition temp. (°C.) | −0.2 | −8.8 | −38.8 |
| Functional groups | | | |
| Functional groups | — | —COOH | —OH |
| Equivalent wt. (g/Equiv.) | — | 1000 | 560 |
| Quantity of surfactant relative to total quantity of monomers (wt %) | 1.4 | 1.4 | 1.4 |

TABLE 2

| | Preparation example | | Comparison example | |
|---|---|---|---|---|
| Water-compatibilised acrylic resin | 7<br>B-4 | 8<br>B-5 | 3<br>b-6 | 4<br>b-7 |
| Monomer mixture (1) | | | | |
| Styrene | 16.0 | 3.0 | 28.0 | 28.0 |
| n-Butyl acrylate | 53.5 | 67.3 | 21.5 | 21.5 |
| Methyl methacrylate | 5.1 | 1.6 | 27.8 | 27.8 |
| Acrylic acid | | | | |
| Acrolein | 3.4 | | | |
| Glycidyl methacrylate | | | 6.1 | |
| 2-Hydroxyethyl acrylate | | | 20.7 | 20.7 |
| Acrylamide | 2.0 | 2.0 | 2.0 | 2.0 |
| Diethylene glycol dimethacrylate | | | | |
| Sub-total | 80.0 | 80.0 | 100.0 | 100.0 |
| Monomer mixture (2) | | | | |
| Styrene | 2.2 | | | |
| n-Butyl acrylate | 13.0 | 16.3 | | |
| Methyl methacrylate | 1.6 | | | |
| Acrolein | 2.2 | | | |
| Glycidyl methacrylate | | 3.0 | | |
| Acrylamide | 1.0 | 0.7 | | |
| Sub-total | 20.0 | 20.0 | 0 | 0 |
| Total | 100.0 | 100.0 | 100.0 | 100.0 |
| Glass transition temp. (°C.) | −18.8 | −39.2 | 25.5 | 25.5 |
| Functional groups | | | | |
| Functional groups | —CO | epoxy | —OH | —OH |
| Equ. wt. (g/Equiv) | 1000 | 1560 | 560 | 560 |
| Quantity of surfactant relative relative to total monomers (wt %) | 1.4 | 1.4 | 1.4 | 5.5 |

TABLE 3

| | | Type of primer paint | | |
|---|---|---|---|---|
| | | P-1 | P-2 | P-3 |
| Primer paint composition (parts by weight) | | | | |
| Resin solids composition (1) | | | | |
| Component (A) | type | A-1 | A-1 | A-1 |
| Modified polyolefin resin | amount | 60 | 50 | 40 |
| Component (B) | type | B-1 | B-2 | B-4 |
| Acrylic resin | amount | 40 | 30 | 52.0 |
| Component (C) | type | — | 2) | — |
| Polyurethane resin | amount | — | 20 | — |
| Curing agent component | type | — | — | 3) |
| | amount | — | — | 8.0 |
| Resin solids (total) | | 100 | 100 | 100 |
| Pigment | amount | 50 | 50 | 50 |
| Deionised water | amount | 300 | 300 | 300 |
| Organic solvent | amount | 50 | 50 | 50 |
| Resin solids ratio (B)/(C) | | 100/0 | 60/40 | 100/0 |
| Curing agent functional groups X | | — | — | —NH$_2$ |
| Functional groups in (A)–(C) reacting with X | | — | — | —CO |
| X/Y mol ratio | | — | — | 0.7 |

TABLE 4

| | | Type of primer paint | |
|---|---|---|---|
| | | P-4 | P-5 |
| Primer paint composition (parts by weight) | | | |
| Resin solids composition (1) | | | |
| Component (A) | type | A-2 | A-3 |
| Modified polyolefin resin | amount | 50 | 65 |
| Component (B) | type | B-4 | B-5 |
| Acrylic resin | amount | 48.0 | 32.0 |
| Component (C) | type | — | — |
| Polyurethane resin | amount | — | — |
| Curing agent component | type | 4) | 5) |
| | amount | 2.0 | 3.0 |
| Resin solids (total) | | 100 | 100 |
| Pigment | amount | 50 | 50 |
| Deionised water | amount | 300 | 300 |
| Organic solvent | amount | 50 | 50 |
| Resin solids ratio (B)/(C) | | 100/0 | 100/0 |
| Curing agent functional groups X | | H$_2$N—NH | H$_2$N—NH |
| Functional groups in (A)–(C) reacting with X | | —CO | epoxy |
| X/Y mol ratio | | 1.0 | 1.2 |

(1) Amounts included are expressed as solids
2) Takelac W610 (trade name, Takeda Chemical Industries; dispersed polyurethane resin break elongation 390%; acid value 20 mg KOH/g; solids 35%)
3) Aquatote 8535 (trade name, Rhône-Poulenc; water-soluble polyamidoamine; amino value 102; solids 50%)
4) Adipic acid dihydrazide
5) Amicure VDH (trade name, Ajinomoto KK; chemical name 1,3-bis(hydrazinocarboethyl)-5-isopropyl-hydrantoin; water-soluble; solids 100%)

2) Preparation of Test Pieces
(Plastic materials)

Polyamide (abbreviation PA): 1013 RW-1 (trade name, Ube Industries)

Poly(butylene terephthalate) (abbreviation PBT): 5201X11 (trade name, Toray)

Unsaturated polyester (abbreviation SMC): N12 (trade name, Takeda Chemical Industries)

Polyurethane (abbreviation PU): Elastolan RVP-2002 (trade name, Takeda Badische Urethan Industries)

Polycarbonate (abbreviation PC): Iupilon MB-2201 (trade name, Mitsubishi Gas Chemical)

High-rigidity polypropylene (abbreviation PP-A): TX-933A (trade name, Mitsubishi Petrochemical)

Soft type polypropylene (abbreviation PP-B): TT-2024 (trade name, Mitsubishi Petrochemical)

After washing with a common neutral household detergent, the above plastic materials were rinsed with tap water to completely remove the detergent. They were then washed with deionised water and dried at 60° C. before being painted.

The water-based primer paints of Embodiments 1–13 were spray painted onto the different plastic materials to give a dry paint film thickness of approximately 15 μm in the combinations of water-based primer paints and plastic materials recorded in Table 5, and dried for 10 minutes at 80° C. Then, as topcoat paint, Plymac PMH-100 Basecoat (registered trade mark of Nippon Oil & Fats; 2-liquid urethane type paint) was sprayed on to give a dry film thickness of approximately 18 μm and left to dry at room temperature for 3 minutes, followed by spray painting with Plymac PMH-220 Clear (registered trade mark Nippon Oil & Fats; 2-liquid urethane type paint) to give a dry film thickness of approximately 30 μm, leaving to dry at room temperature for 10 minutes, and then baking at 80° C. for 40 minutes, to give the test pieces.

3) Methods for Testing Paint Film Performance
(Adhesion)

Evaluated on the basis of the number of squares in which paint remained without being peeled off when a 100-square matrix was made by scoring 11 horizontal and vertical lines at 1-mm intervals through to the material with a cutter knife, and then a cellophane sticky tape was firmly attached and peeled off in a single pull (according to JIS K5400C (1990) 8.5.2: "Cross-hatch tape method"), using the criteria below.

Remaining squares: Evaluation
100: ○ Good
99-80: Δ Poor
80-0: X Very poor (Petrol resistance)

I The test piece was immersed for 30 minutes in high-octane petrol at room temperature.

II (Petrol/alcohol resistance): The test piece was immersed for 30 minutes in a liquid mixture comprising 95 parts regular petrol and 5 parts ethanol at room temperature.

In both I and II, the presence of blistering and peeling of the paint film were evaluated by the criteria below (according to JIS K5400 (1990) 8.24 "Resistance to volatile oils").

○ Good: No blistering or peeling of the paint film
Δ Poor: Blistering of the paint film
X Very poor: Peeling of the paint film (Bending resistance)

The test piece was cooled to −20° C., and after bending through 180° around a 50-mm diameter cylinder with the painted surface on the outside, the state of the painted surface was observed and evaluated by the criteria below (according to JIS K5400 (1990) 8.1 "Bending resistance")

○ Good: No cracks in the paint film
Δ Poor: Cracks in the paint film

X Very poor: Cracks through to the material
(Impact resistance)

The test piece was cooled to −20° C. and gripped in an impact mould of radius 6.35 mm with the paint surface facing upward, using a Dupont type impact tester; damage to the paint film when a 500 g weight was dropped from a height of 20 cm was observed visually, and assessed by the criteria below (JIS K5400 (1990) 8.3.2 "Dupont")

○ Good: No cracking of the paint film

Δ Poor: Cracks of the paint film

X Very Poor: Cracks through to the material
(Water resistance)

After immersion for 120 hours in deionised water at 40° C., the paint film was checked for blistering, and evaluated by the criteria below (according to JIS K540 (1990) 8.19 "Water resistance").

○ Good: No marked change noticeable in the paint film

Δ Poor: Blistering (diam. ≧0.2 mm) noted in the paint film

X Very poor: Considerable number of blisters (diam. ≧0.2 mm) noted in the paint film (≧3/cm²)
(Humidity resistance)

The test piece was checked for blistering after 120 hours in a closed vessel at temperature 50°±1° C. and relative humidity _98%. The criteria of evaluation were the same as for water-resistance above (according to JIS K5400 (1990) 9.2.2. (rotating type)).

(Primer surface tackiness)

Evaluated by touching the surface of the dry primer paint film with the finger.

The paint film performance of each of the test pieces was evaluated by the test methods and criteria of evaluation above. The results are shown in Table 5.

TABLE 6

| | | Type of primer paint | | |
|---|---|---|---|---|
| | | P-6 | P-7 | P-8 |
| Primer paint composition (parts by weight) | | | | |
| Resin solids composition (1) | | | | |
| Component (A) | type | A-1 | A-2 | A-2 |
| Modified polyolefin resin | amount | 30 | 30 | 25 |
| Component (B) | type | B-2 | B-2 | B-2 |
| Acrylic resin | amount | 46.0 | 44.0 | 55.0 |
| Component (C) | type | 6) | 8) | — |
| Polyurethane resin | amount | 11.5 | 18.9 | — |
| Curing agent component | type | 7) | 9) | 10) |
| | amount | 12.5 | 7.1 | 20.0 |
| Resin solids (total) | | 100 | 100 | 100 |
| Pigment | amount | 50 | 50 | 50 |
| Deionised water | amount | 300 | 300 | 300 |
| Organic solvent | amount | 50 | 50 | 50 |
| Resin solids ratio (B)/(C) | | 80/20 | 70/30 | 100/0 |
| Curing agent functional groups X | | epoxy | epoxy | oxazoline |
| Functional groups in (A)–(C) reacting with X | | —COOH | —COOH | —COOH |
| X/Y mol ratio | | 0.8 | 0.6 | 0.5 |

TABLE 5

| | Embodiment | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Type of plastic material | | | | P-1 | | | | P-2 | | P-3 | | P-4 | P-5 |
| Paint film performance Water-based primer paint | PA | PBT | SMC | PU | PC | PP-A | PP-B | PP-A | PP-B | PP-A | PP-B | PP-A | PP-A |
| Adhesion | ○ | ○ | ○ | ○ | ○ | ○ | ○ | ○ | ○ | ○ | ○ | ○ | ○ |
| Petrol resistance I | ○ | ○ | ○ | ○ | ○ | ○ | ○ | ○ | ○ | ○ | ○ | ○ | ○ |
| Petrol resistance II | — | — | — | — | — | — | — | — | — | ○ | ○ | ○ | ○ |
| Bending resistance | ○ | ○ | ○ | ○ | ○ | ○ | ○ | ○ | ○ | ○ | ○ | ○ | ○ |
| Impact resistance | ○ | ○ | ○ | ○ | ○ | ○ | ○ | ○ | ○ | ○ | ○ | ○ | ○ |
| Water resistance | ○ | ○ | ○ | ○ | ○ | ○ | ○ | ○ | ○ | ○ | ○ | ○ | ○ |
| Humidity resistance | ○ | ○ | ○ | ○ | ○ | ○ | ○ | ○ | ○ | ○ | ○ | ○ | ○ |
| Primer surface tackiness | | | | slight | | | | | | | none | | |

Embodiments 14–27

1) Preparation of Water-Based Primer Paints P-6 to P-10

Water-Based Primer Paints were prepared by the same method as in Embodiments; 1–13, based on the primer paint compositions shown in Table 6 and Table 7.

TABLE 7

| | | Type of primer paint | |
|---|---|---|---|
| | | P-9 | P-10 |
| Primer paint composition (parts by weight) | | | |
| Resin solids composition (1) | | | |
| Component (A) | type | A-1 | A-2 |
| Modified polyolefin resin | amount | 35 | 40 |
| Component (B) | type | B-3 | B-1 |
| Acrylic resin | amount | 38.5 | 60 |
| Component (C) | type | 11) | — |
| Polyurethane resin | amount | 16.5 | — |
| Curing agent component | type | 12) | — |
| | amount | 10.0 | — |
| Resin solids (total) | | 100 | 100 |
| Pigment | amount | 50 | 50 |
| Deionised water | amount | 300 | 300 |
| Organic solvent | amount | 50 | 50 |
| Resin solids ratio (B)/(C) | | 70/30 | 100/0 |
| Curing agent functional groups X | | —OC$_2$H$_5$ | — |
| Functional groups in (A)–(C) reacting with X | | —OH | — |
| X/Y mol ratio | | 1.6 | — |

(Notes on Table 6 and Table 7)
6) U-coat UX-4560 (trade name, Sanyo Chemical Industries; polyurethane resin aqueous dispersion; break elongation 270%; acid value 34 mg KOH/g; solids 30%)
7) Aquatote 510 (trade name, Rhône-Poulenc; bisphenol A type epoxy resin; epoxy equivalent 200 g; water-dispersible; solids 100%)
8) Neorek R960 [trade name, Zenekarejinzu KK; polyurethane resin aqueous dispersion; break elongation 200%; acid value 30 mg KOH/g; solids 33%)
9) Denacol EX-611 (trade name, Nagase Chemical Industries; sorbitol glycidyl ether; epoxy equivalent 170 g; water soluble; solids 100%)
10) Epocross CX-K2020E (trade name, Nippon Shokubai; acrylic resin aqueous dispersion; oxazoline group equivalent 600 g; solids 40%)
11) U-coat UX-4300 (trade name, Sanyo Chemical Industries, polyurethane aqueous dispersion; break elongation 400%; acid value 20 mg KOH/g; solids 40%)
12) Cymel 327 (trade name, Mitsui Cyanamid; methylated melamine resin; water dispersible; solids 90%)

2) Making Test Pieces

The materials were cleaned before painting as in Embodiments 1–13, with the addition to the plastic materials of ultra-high rigidity polypropylene (abbreviation PP-C): TX-1180 (trade name, Mitsubishi Petrochemical).

The water-based primer paints of Embodiments 14–27 were spray painted onto different plastic materials in the combinations of water-based primer paint and plastic material recorded in Table 8, to give a dry film thickness of approximately 15 μm, and dried at 80° C. for 10 minutes. Then, as a topcoat paint, Plymac No. 5500 basecoat (registered trade mark of Nippon Oil & Fats; acrylic polyol/melamine resin cured I-liquid paint) was spray painted on to give a dry film thickness of approximately 18 μm and stood for 3 minutes at room temperature, followed by spray painting with Plymac No.5500 clear (registered trade mark of Nippon Oil & Fats; acrylic polyol/melamine resin cured 1-liquid paint) to give a dry film thickness of approximately 30 μm, standing at room temperature for 10 minutes, and baking at 120° C. for 40 minutes, to give the test pieces.

3) Methods for Testing Paint Film Performance

The paint film performance of each of the test pieces was evaluated by the same test methods and criteria of evaluation as in Embodiments 1–13. The results are shown in Table 8.

TABLE 8

| | Embodiment | | | | | | | | | | | | | |
|---|---|---|---|---|---|---|---|---|---|---|---|---|---|---|
| | 14 | 15 | 16 | 17 | 18 | 19 | 20 | 21 | 22 | 23 | 24 | 25 | 26 | 27 |
| Type of plastic material | P-6 | | | P-7 | | | P-8 | | | | | | P-9 | P-10 |
| Paint film performance Water-based primer paint | PP-A | PP-B | PP-C | PP-A | PA | PBT | SMC | PU | PC | PP-A | PP-B | PP-C | PP-A | PP-A |
| Adhesion | ◯ | ◯ | ◯ | ◯ | ◯ | ◯ | ◯ | ◯ | ◯ | ◯ | ◯ | ◯ | ◯ | ◯ |
| Petrol resistance I | ◯ | ◯ | ◯ | ◯ | ◯ | ◯ | ◯ | ◯ | ◯ | ◯ | ◯ | ◯ | ◯ | ◯ |
| Petrol resistance II | ◯ | ◯ | ◯ | ◯ | ◯ | ◯ | ◯ | ◯ | ◯ | ◯ | ◯ | ◯ | ◯ | — |
| Bending resistance | ◯ | ◯ | ◯ | ◯ | ◯ | ◯ | ◯ | ◯ | ◯ | ◯ | ◯ | ◯ | ◯ | ◯ |
| Impact resistance | ◯ | ◯ | ◯ | ◯ | ◯ | ◯ | ◯ | ◯ | ◯ | ◯ | ◯ | ◯ | ◯ | ◯ |
| Water resistance | ◯ | ◯ | ◯ | ◯ | ◯ | ◯ | ◯ | ◯ | ◯ | ◯ | ◯ | ◯ | ◯ | ◯ |
| Humidity resistance | ◯ | ◯ | ◯ | ◯ | ◯ | ◯ | ◯ | ◯ | ◯ | ◯ | ◯ | ◯ | ◯ | ◯ |
| Primer surface tackiness | | | | | | none | | | | | | | | *1 |

*1 slight

Comparison Examples 1–9

1) Preparation of Water-Based Primer Paints P-11 to P-19

Water-Based Primer Paints P-11 to P-19 were prepared by the same method as in Embodiments 1–13, based on the primer paint compositions shown in Table 9 to Table 11.

TABLE 9

| | | Type of primer paint | | |
|---|---|---|---|---|
| | | P-11 | P-12 | P-13 |
| Primer paint composition (parts by weight) | | | | |
| Resin solids composition 1) | | | | |
| Component (A) | type | A-1 | A-2 | a-4 |
| Modified polyolefin resin | amount | 20 | 50 | 40 |
| Component (B) | type | B-1 | B-2 | B-4 |
| Acrylic resin | amount | 80 | 15 | 52.0 |
| Component (C) | type | — | 2) | — |
| Polyurethane resin | amount | — | 35 | — |
| Curing agent component | type | — | — | 3) |
| | amount | — | — | 8.0 |
| Resin solids (total) | | 100 | 100 | 100 |
| Pigment | amount | 50 | 50 | 50 |
| Deionised water | amount | 300 | 300 | 300 |
| Organic solvent | amount | 50 | 50 | 50 |
| Resin solids ratio (B)/(C) | | 100/0 | 30/70 | 100/0 |
| Curing agent functional groups X | | — | — | —$NH_2$ |
| Functional groups in (A)–(C) reacting with X | | — | — | —CO |
| X/Y mol ratio | | — | — | 0.7 |

TABLE 10

| | | Type of primer paint | | |
|---|---|---|---|---|
| | | P-14 | P-15 | P-16 |
| Primer paint composition (parts by weight) | | | | |
| Resin solids composition (1) | | | | |
| Component (A) | type | a-5 | A-1 | A-1 |
| Modified polyolefin resin amount | | 50 | 50 | 50 |
| Component (B) | type | B-2 | B-2 | B-2 |
| Acrylic resin | amount | 30 | 30 | 30 |
| Component (C) | type | 2) | 13) | 14) |
| Polyurethane resin | amount | 20 | 20 | 20 |
| Curing agent component | type | — | — | — |
| | amount | — | — | — |
| Resin solids (total) | | 100 | 100 | 100 |
| Pigment | amount | 50 | 50 | 50 |
| Deionised water | amount | 300 | 300 | 300 |
| Organic solvent | amount | 50 | 50 | 50 |
| Resin solids ratio (B)/(C) | | 60/40 | 60/40 | 60/40 |
| Curing agent functional groups X | | — | — | — |

TABLE 10-continued

| | Type of primer paint | | |
|---|---|---|---|
| | P-14 | P-15 | P-16 |
| Functional groups in (A)–(C) reacting with X | — | — | — |
| X/Y mol ratio | — | — | — |

TABLE 11

| | | Type of primer paint | | |
|---|---|---|---|---|
| | | P-17 | P-18 | P-19 |
| Primer paint composition (parts by weight) | | | | |
| Resin solids composition (1) | | | | |
| Component (A) | type | A-1 | A-1 | A-1 |
| Modified polyolefin resin | amount | 50 | 50 | 50 |
| Component (B) | type | b-6 | b-7 | — |
| Acrylic resin | amount | 50 | 30 | — |
| Component (C) | type | — | 2) | 2) |
| Polyurethane resin | amount | — | 20 | 50 |
| Curing agent component | type | — | — | — |
| | amount | — | — | — |
| Resin solids (total) | | 100 | 100 | 100 |
| Pigment | amount | 50 | 50 | 50 |
| Deionised water | amount | 300 | 300 | 300 |
| Organic solvent | amount | 50 | 50 | 50 |
| Resin solids ratio (B)/(C) | | 100/0 | 60/40 | 0/100 |
| Curing agent functional groups X | | — | — | — |
| Functional groups in (A)—(C) reacting with X | | — | — | — |
| X/Y mol ratio | | — | — | — |

(Notes, Table 9 to Table 11)
1) Amounts included based on solids
2) See Table 3 2)
3) See Table 3 3)
13) Spensol L46 (trade name, Dainippon Ink & Chemicals; polyurethane resin aqueous dispersion; break elongation 650%; solids 33%)
14) Spensol L50 (trade name, Dainippon Ink & Chemicals; polyurethane resin aqueous dispersion; break elongation 100%; solids 30%)

2) Making Test Pieces

Test pieces were made by the same method as in Embodiments 1–13 except that only the propylene material (abbreviation PP-A) used in Embodiments 1–13 was employed, being painted with the water-based primers shown in Table 12.

3) Methods for Testing Paint Film Performance

Paint film performance was evaluated by the same test methods and criteria of evaluation as in Embodiments 1–13. The results are shown in Table 12.

TABLE 12

| | Comparison Example | | | | | | | | |
|---|---|---|---|---|---|---|---|---|---|
| | 1 | 2 | 3 | 4 | 5 | 6 | 7 | 8 | 9 |
| Type of plastic material | P-11 | P-12 | P-13 | P-14 | P-15 | P-16 | P-17 | P-18 | P-19 |
| Paint film performance Water-based primer paint | PP-A | PP-A | PP-A | PP-A | PP-A | PP-A | PP-A | PP-A | PP-A |
| Adhesion | Δ | ◯ | X | X | ◯ | ◯ | ◯ | ◯ | ◯ |

TABLE 12-continued

|  | Comparison Example | | | | | | | | |
|---|---|---|---|---|---|---|---|---|---|
|  | 1 | 2 | 3 | 4 | 5 | 6 | 7 | 8 | 9 |
| Petrol resistance I | ○ | ○ | ○ | X | ○ | ○ | ○ | ○ | ○ |
| Petrol resistance II | — | — | — | — | — | — | — | — | — |
| Bending resistance | ○ | ○ | Δ | X | ○ | Δ | X | X | ○ |
| Impact resistance | ○ | ○ | Δ | X | ○ | Δ | X | X | ○ |
| Water resistance | ○ | Δ | X | ○ | ○ | ○ | ○ | X | X |
| Humidity resistance | ○ | X | X | ○ | ○ | ○ | ○ | X | X |
| Primer surface tackiness | yes | no | slight | yes | no | no | no | no | no |

We claim:

1. Water-based paint composition comprising a resin component comprising a mixture of
   (A) water-compatibilised polyolefin resins which are reacted with an α,β-unsaturated carboxylic acid, said resins having a saponification value of 10–60 mg KOH/g, a number average molecular mass of 4000–30,000 and a degree of chlorination in the range 0–30 wt %, and
   (B) water-compatibilised acrylic resins with a glass transition temperature of −50° to +20° C., and
   (C) water-compatibilised polyurethane resins which give a dry film with a break elongation in the range 200–600% at 20° C., in which, in the total quantity of resin solids, the amount of Component (A) is 25–70 wt %, the sum of Component (B) and Component (C) is 30–75 wt %, and the ratio by weight of resin solids of Component (B) to Component (C), respectively, is between 100:0 and 50:50.

2. Water-based paint composition according to claim 1, wherein Component (B) has at least 1 type of functional group selected from the group consisting of carboxyl groups, carbonyl groups, epoxy groups and hydroxyl groups, and mixtures thereof and that the equivalent weight of functional groups in Component (B) is in the range of 500–2000 g/Equivalent, and further comprising (D) a water-based curing agent which reacts with the aforementioned functional groups.

3. Painting method comprising the steps of applying a water-based paint composition according to claim 1, to a plastic material, and subsequently drying the composition to form a paint film.

4. Paint film obtained by painting a water-based paint composition according to claim 1, and drying the paint composition.

5. Paint film obtained by painting a water-based paint composition according to claim 2, and drying the paint composition.

6. A coated article comprising a plastic material having thereon a water-based paint composition according to claim 1.

7. A coated article comprising a plastic material having thereon a water-based paint composition according to claim 2.

* * * * *